(12) United States Patent
Larsson et al.

(10) Patent No.: US 11,724,654 B2
(45) Date of Patent: Aug. 15, 2023

(54) WEIGHT OPTIMIZATION

(71) Applicant: Metso Sweden AB, Trelleborg (SE)

(72) Inventors: Fredrik Larsson, Malmö (SE); Henrik Persson, Trelleborg (SE); Lars Grönvall, Trelleborg (SE)

(73) Assignee: Metso Sweden AB, Trelleborg (SE)

(*) Notice: Subject to any disclaimer, the term of this patent is extended or adjusted under 35 U.S.C. 154(b) by 682 days.

(21) Appl. No.: 16/623,216

(22) PCT Filed: Jun. 21, 2018

(86) PCT No.: PCT/EP2018/066680
§ 371 (c)(1),
(2) Date: Dec. 16, 2019

(87) PCT Pub. No.: WO2018/234513
PCT Pub. Date: Dec. 27, 2018

(65) Prior Publication Data
US 2021/0146854 A1 May 20, 2021

(30) Foreign Application Priority Data

Jun. 22, 2017 (EP) .................................... 17177441

(51) Int. Cl.
*B60R 13/01* (2006.01)
*B29D 99/00* (2010.01)
*B60P 1/28* (2006.01)

(52) U.S. Cl.
CPC .............. *B60R 13/01* (2013.01); *B29D 99/00* (2013.01); *B29K 2995/0046* (2013.01); *B60P 1/28* (2013.01); *B60P 1/286* (2013.01)

(58) Field of Classification Search
CPC ............. B60R 13/01; B60P 1/28; B60P 1/286
USPC ..................... 296/183.2, 39.1, 39.2
See application file for complete search history.

(56) References Cited

U.S. PATENT DOCUMENTS

| | | |
|---|---|---|
| 3,912,325 A | 10/1975 | Sudyk |
| 4,029,354 A | 6/1977 | Valeri |
| 4,629,354 A | 12/1986 | Freese |
| 6,007,132 A | 12/1999 | Burg et al. |

(Continued)

FOREIGN PATENT DOCUMENTS

| | | |
|---|---|---|
| AU | 622917 B2 | 1/1990 |
| AU | 622917 B2 | 4/1992 |

(Continued)

OTHER PUBLICATIONS

Office Action for corresponding Kazakhstan Patent Application No. 2019/0916.1.

(Continued)

*Primary Examiner* — Dennis H Pedder
(74) *Attorney, Agent, or Firm* — Andrus Intellectual Property Law, LLP

(57) ABSTRACT

A lining element for a wear-resistant haul truck body lining comprises a reinforcement plate being at least partly embedded in elastic material. The reinforcement plate comprises a plurality of mounting holes which are arranged for mounting the lining element to a haul truck body and which are not covered by the elastic material, and one or more weight-reducing cut-out openings which are larger than the mounting holes and which are covered by the elastic material.

20 Claims, 4 Drawing Sheets

(56) References Cited

U.S. PATENT DOCUMENTS

| | | | |
|---|---|---|---|
| 6,687,132 B2 | 2/2004 | Orcutt et al. | |
| 7,877,948 B2 * | 2/2011 | Davies | F16B 5/0225 |
| | | | 411/397 |
| 2020/0215995 A1 | 7/2020 | Persson et al. | |

FOREIGN PATENT DOCUMENTS

| | | |
|---|---|---|
| EP | 3418117 A1 | 12/2018 |
| GB | 2109303 A | 6/1983 |
| RU | 2408478 C1 | 1/2011 |
| RU | 2415044 C1 | 3/2011 |
| RU | 166563 U1 | 12/2016 |

OTHER PUBLICATIONS

Translation of Office Action and Search Report for corresponding Russian Patent Application No. 2019141313/11 (080738) dated Aug. 12, 2021.
International Search Report and Written Opinion for International Application No. PCT/EP2018/066680 dated Sep. 26, 2018.

\* cited by examiner

WEIGHT OPTIMIZATION

CROSS-REFERENCE TO RELATED APPLICATIONS

This application is the U.S. national stage application of International Application PCT/EP2018/066680, filed Jun. 21, 2018, which international application was published on Dec. 27, 2018, as International Publication WO 2018/234513 A1 in the English language. The International Application claims priority of European Patent Application No. 17177441.7 filed Jun. 22, 2017.

TECHNICAL FIELD

The present invention relates to a haul truck body lining element, to a haul truck body provided with wear-resistant lining and to a method for manufacturing a lining element.

BACKGROUND ART

Haul trucks are off-highway dump trucks engineered for use in high-production mining and heavy-duty construction environments. The haul trucks are equipped with haul truck bodies capable of accommodating a large amount of material, such as rock, crushed ore or the like. Haul truck capacities range from 40 short tons (36 t) to 496 short tons. The bottom area of such a haul truck body is typically 30 to 70 square meters.

Hauling such masses of often sharp and heavy load makes the haul truck body experiencing a heavy wear due to impact and abrasion.

To protect the surface of the haul truck body, it is common to equip the interior if the haul truck body with a lining. Whereas the haul truck body usually is made from steel, the lining material is often made from another material. One commonly used type of lining is an elastic lining comprising for example a rubber material or polyurethane. An advantage of the elastic lining material is that its material properties will mitigate the effects of heavy impact of material on the haul truck body as material is hauled from quite some altitude onto the haul truck body from for example an excavator.

The elastic lining material effectively absorbs the energy from the impact and distributes said energy over a larger area. Moreover, the noise is reduced and the comfort for the operator improved.

Lining for haul trucks are usually made from a plurality of lining elements extending over surfaces of the haul truck body to form the lining. The separate lining elements simplifies manufacture by limiting its dimensions and mass. Moreover, it facilitates service of the haul truck body, as individual damaged or worn-out lining elements may be exchanged directly on site without having to remove large parts of the surrounding lining. Lining elements may comprise a reinforcement plate, usually made from steel, together with a rubber coating.

There is always a need to improve the payload capacity of such a haul truck.

SUMMARY OF THE INVENTION

To this end, there is provided a lining element for a wear-resistant haul truck body lining, said lining element comprising a reinforcement plate being at least partly embedded in elastic material, wherein said reinforcement plate comprises a plurality of mounting holes which are arranged for mounting the lining element to a haul truck body and which are not covered by the elastic material, and one or more weight-reducing cut-out openings which are larger than the mounting holes and which are covered by the elastic material. Further, the reinforcement plate comprises one or more bent edges.

While the mounting holes are not covered by the elastic material, they may, for example, be covered by rubber plugs. With the mounting holes arranged for mounting the lining element to a haul truck body, they will match mounting structures on the haul truck body, which for example may comprise corresponding holes or fixed bolts. A plate may therefore be adapted to specific mounting structures by placing the mounting holes accordingly.

The term "cut-out openings" should be understood not to be limited to openings formed by cutting, but include openings in general formed by any procedure, including those formed, for instance by molding.

Arranging cut-out openings in the reinforcement plate allows the weight of the lining element to be reduced while retaining adequate stiffness of the lining element to keep its desired shape, for example planar. The reduced weight allows the haul truck to be able to carry more useful payload. The bent edges of the reinforcement plate will help keeping the lining element in a preferred shape, for example planar. The bent edges grip into the elastic material, keeping it in place. Rubber tends to shrink after the manufacturing process, which otherwise would cause the plate to be bent out of shape. Furthermore, they provide additional strength and stiffness to the plate.

The reinforcement plate may further have an outer frame extending along the peripheral edge of the lining element, where the cut-out openings are arranged inside the outer frame. This provides further stiffness to the plate and thereby the lining element, allowing for the cut-out openings to be made larger and thereby further reducing the weight of the lining element. At least some of the mounting holes may be arranged in this outer frame of the reinforcement plate.

There may be two or more cut-out openings arranged inside the frame. This allows for flexibility in the geometry of the lining element, as large areas of the plate may comprise cut-out openings, while one still retains the option of placing mounting holes freely also in central parts of the plate. For example, the reinforcement plate may further comprise one or more strip portions extending between side portions of said outer frame for defining said two or more cut-out openings and at least some of the mounting holes may be arranged in the strip portions. This allows for a stiff plate which still provides large weight reduction.

The outer peripheral edge of the lining element may define an outline area of the reinforcement plate, and said one or more cut-out openings may together define a total cut-out area amounting to at least 20%, preferably at least 30%, of the outline area of the reinforcement plate. Preferably, the total cut-out area may amount to no more than 60%, preferably no more than 40%, of the outline area of the reinforcement plate. This ratio will generally translate to an approximately similar weight reduction compared to a plate without cut-out openings.

The lining element may be planar, which allows for ease of manufacturing and mounting.

The reinforcement plate may comprise one or more bent edges for keeping the lining element planar. The bent edges grip into the elastic material, keeping it in place. Rubber tends to shrink after the manufacturing process, which otherwise would cause the plate to be bent. Furthermore, they provide additional strength and stiffness to the plate.

The bent edges may be partly arranged at an outer periphery of the reinforcement plate. The edges may be bent 90 degrees or more. Preferably, the edges are bent more than 90 degrees. Preferably, the edges are bent less than 180 degrees. Thus, preferably, the edges are bent more than 90 degrees and less than 180 degrees. Alternatively, the edges are bent 180 degrees or 90 degrees. An advantage of the edges being bent more than 90 degrees is that the elastic material is less likely to be cut by the edges during loading of the haul truck. An advantage of the edges being bent less than 180 degrees is better grip of the elastic material.

The reinforcement plate may be made in one piece and may be made of metal, preferably of steel. The elastic material may comprise rubber.

The lining element may further comprise a plurality of holes arranged in the elastic material and aligned with the mounting holes of the reinforcement plate. This allows the mounting holes to be reached when mounting the lining element.

The cut-out openings may be shaped as rectilinear polygons, such as rectangles, which allows for ease of manufacturing.

The reinforcement plate may be completely embedded in the elastic material, optionally except for areas at said mounting holes of the reinforcement plate.

Further, there is provided a haul truck body provided with an inner wear-resistant lining formed by a plurality of lining elements as per above. The haul truck body may have a plurality of mounting structures aligned with the mounting holes of said plurality of lining elements, where the cut-out openings of the lining elements are located in areas the lining elements corresponding to areas of the haul truck body without mounting structures. Further there is provided a method for manufacturing a lining element, which comprises arranging a reinforcement plate in a mold, where the reinforcement plate presents a plurality of mounting holes and one or more weight-reducing cut-out openings which are larger than the mounting holes and wherein the reinforcement plate further comprises one or more bent edges; and supplying an elastic material to said mold, such that the reinforcement plate is at least partly covered by the elastic material and such that the weight-reducing cut-out openings are covered by the elastic material. The method may further comprise bending one or more edges of the reinforcement element before arranging the reinforcement plate in the mold, where the supplying of elastic material comprises covering the one or more bent edges of the reinforcement plate with the elastic material.

The method may further optionally exclude areas at the mounting holes from being covered by the elastic material, when the reinforcement plate is otherwise completely covered by the elastic material.

The method may further comprise, before arranging the reinforcement plate in the mold, providing the reinforcement plate with said plurality of mounting holes, where said plurality of mounting holes align with a plurality of mounting structures of a haul truck body; and, also before arranging the reinforcement plate in the mold, providing the reinforcement plate with said one or more weight-reducing openings, where said one or more weight-reducing openings are located in areas of the reinforcement plate corresponding to areas of the haul truck body without mounting structures.

Finally, the method may comprise mounting the lining element on the haul truck body.

Finally, there is provided a lining element for a wear-resistant haul truck body lining, where the lining element comprises a reinforcement plate being at least partly embedded in elastic material.

The reinforcement plate may comprise a plurality of mounting holes which are arranged for mounting the lining element to a haul truck body. While the mounting holes may not be covered by the elastic material, they may, for example, be covered by rubber plugs.

The reinforcement plate may comprise one or more bent edges for keeping the lining element planar. Preferably, the edges are bent less than 180 degrees. Alternatively, the edges are bent 180 degrees.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DETAILED DESCRIPTION OF PREFERRED EMBODIMENTS OF THE INVENTION

Figure 1:
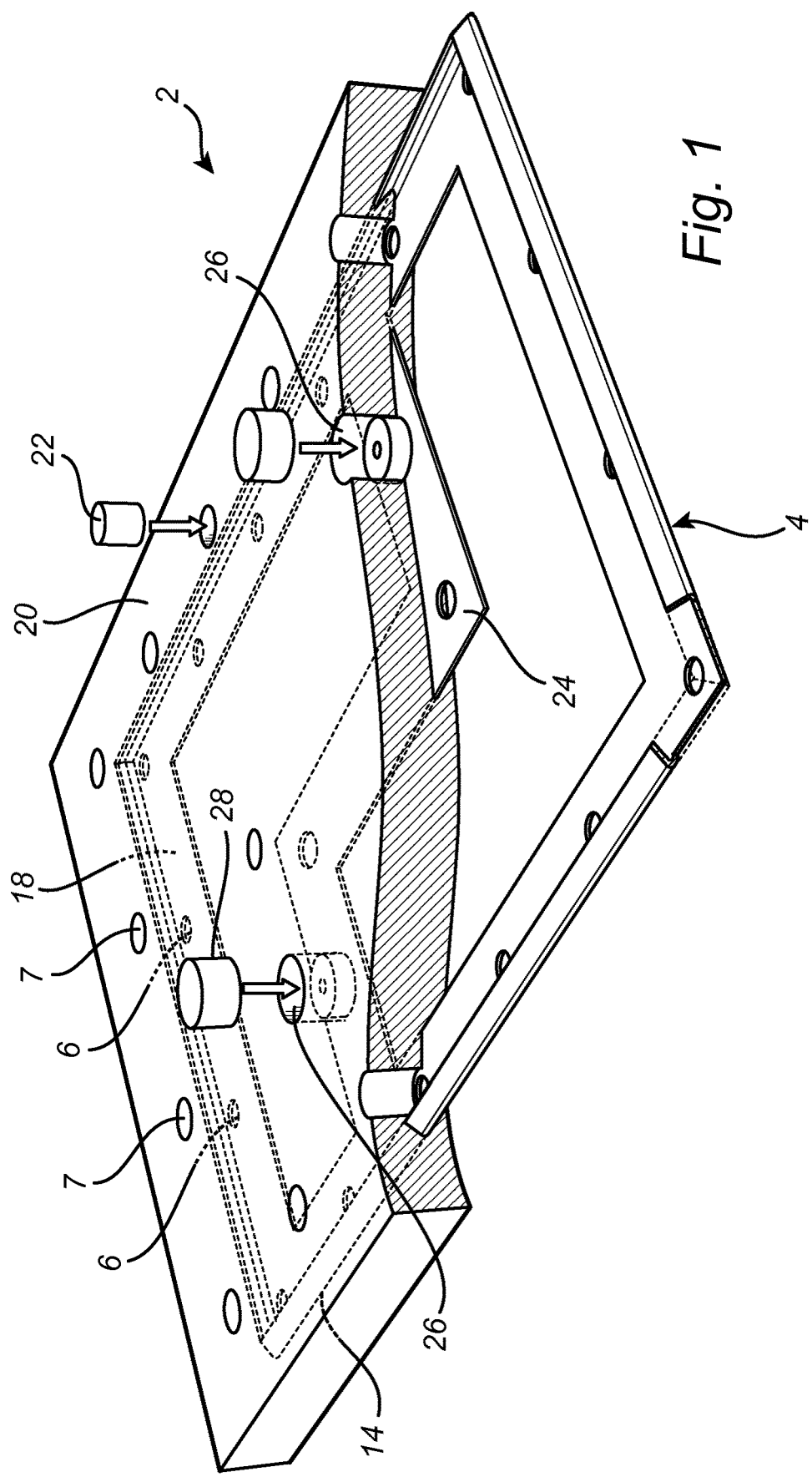
FIG. 1 is a perspective cut-out view of a haul truck lining element including a rubber coating and a reinforcement plate according to a first embodiment.
Figure 2:
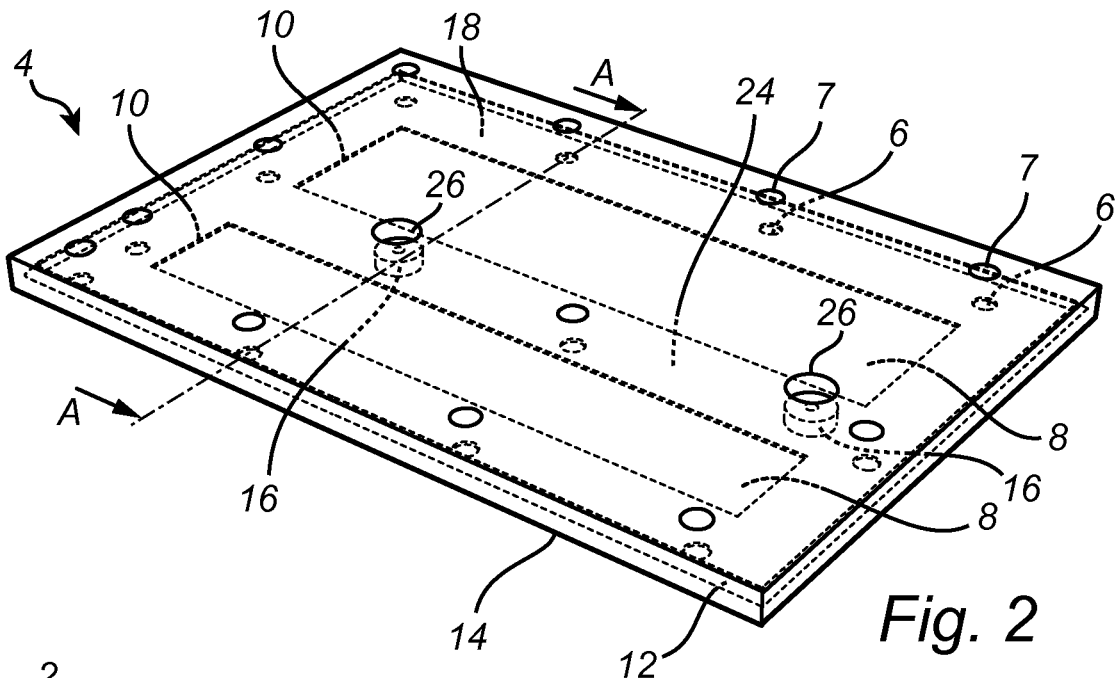
FIG. 2 is a perspective view of a reinforcement plate for a haul truck lining element according to a second embodiment.

FIGS. 1, 2/2A, 3, and 4 illustrate lining elements 2 for a wear-resistant haul truck body lining according to a first, a second, a third, and a fourth embodiment, respectively. FIG. 2B illustrates an alternative embodiment to the second embodiment of FIGS. 2 and 2A. The lining elements 2 are intended to be mounted on a haul truck body 100 (cf. FIG. 6). The lining elements 2 are substantially flat and each comprise a substantially flat reinforcement plate 4 and a rubber coating 20 which constitutes an elastic material 20 covering the reinforcement plate. In FIG. 1, part of the elastic material 20 has been cut out for illustration only.

The reinforcement plates 4 provide stiffness and strength to the lining elements 2 and help to keep the elastic material 20 in place. In these embodiments, the elastic material 20 completely covers the reinforcement plate 4. In other embodiments, the elastic material 20 may only partly cover the reinforcement plate 4. Thus, the reinforcement plate 4 is at least partly embedded in elastic material 20. The reinforcement plates 4 are substantially flat and have a rectangular outline 14. They are preferably made in one piece, as shown, and are preferably made out of metal, such as steel.

Figure 6:
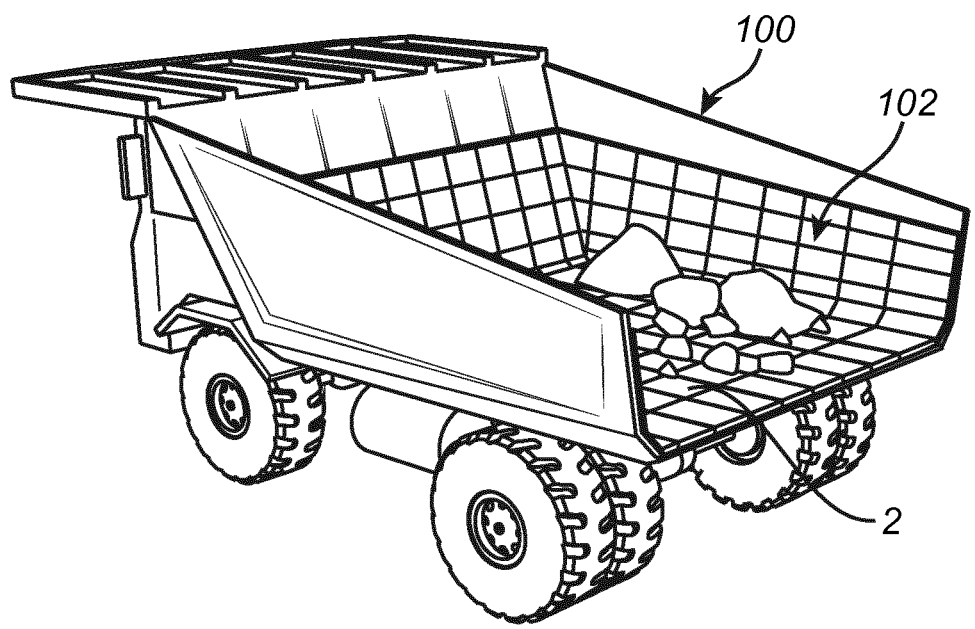
FIG. 6 is a perspective view of a haul truck with a loading area covered by lining elements.

The reinforcement plates 4 comprise a number of mounting holes 6 for mounting the lining element 2, of which the reinforcement plate 4 forms part, on the haul truck body 100 (cf. FIG. 6). The mounting holes 6 correspond to and are adapted to match mounting structures (not shown) on the haul truck body 100. Thereby, the lining element 2, of which the reinforcement plate 4 forms part, will be adapted to be mounted in a specific location (not shown) on the haul truck body 100 (cf. FIG. 6). The mounting structures on the haul truck body 100 may for example comprise welded bolts designed to fit into the mounting holes 6 of the reinforcement plate 4, or an additional plurality of holes each corresponding to the mounting holes 6.

A plurality of holes 7 is present in the elastic material 20, so that it does not cover the mounting holes 6 of the reinforcement plate 4. Optionally, after or as part of installation, the mounting holes 6 may be covered by rubber plugs 22 (shown in FIG. 1 but applicable to all embodiments) for protection.

The reinforcement plates further comprise cut-out openings 8. The cut-out openings 8 are larger than the mounting holes 6 and are arranged at locations where no mounting holes 6 are needed for matching the mounting structures of the haul truck body 100. The cut-out openings 8 may be created by, for example, cutting or machining, but may also be created together with the reinforcement plate 4, for example through molding.

With the cut-out openings 8, each reinforcement plate 4 has the shape of an outer frame 18 extending along and next to its outer peripheral edge 14, providing stiffness to the plate 4, and possibly strip portions 24 extending between sides of the frame 18. At least some of the mounting holes 6 are arranged in the outer frame 18. Thus, the frame 18 and the strip portions 24, if such are present, may be seen as defining the cut-out openings 8. The size of the cut-out openings 8 may be chosen according to need.

The outer edges 12 of the reinforcement plates 4, defining the outline/peripheral edge 14, are bent, contributing to the stiffness of the plates 4.

Cylinder-shaped lifting structures 16, extending from upper surfaces of the plates, are present for lifting the plate during manufacturing, assembly, and/or installation. The distance that the lifting structures 16 extends from the plates is less than the thickness of the rubber. Similar to the case of the mounting holes 6, holes 26 in the elastic material allow access to the lifting structures. Again, these holes 26 may be covered by rubber plugs 28.

Common features of all the embodiments having been described above, specifics of each of the embodiments will now be described.

In the first embodiment, as shown in FIG. 1, a strip portion 24 consists of three orthogonal linear strip segments. Two lifting structures 16 are located on the strip portion 24. Such an arrangement thus allows for a relatively central location of the lifting structures 16 and/or mounting holes 6.

FIG. 2 shows a reinforcement plate 4 which is part of a lining element 2. according to a second embodiment. A linear strip section 24 here extends between the two short sides of the frame 18, thus forming two elongate, rectangular cut-out openings 8.

Figure 2A:
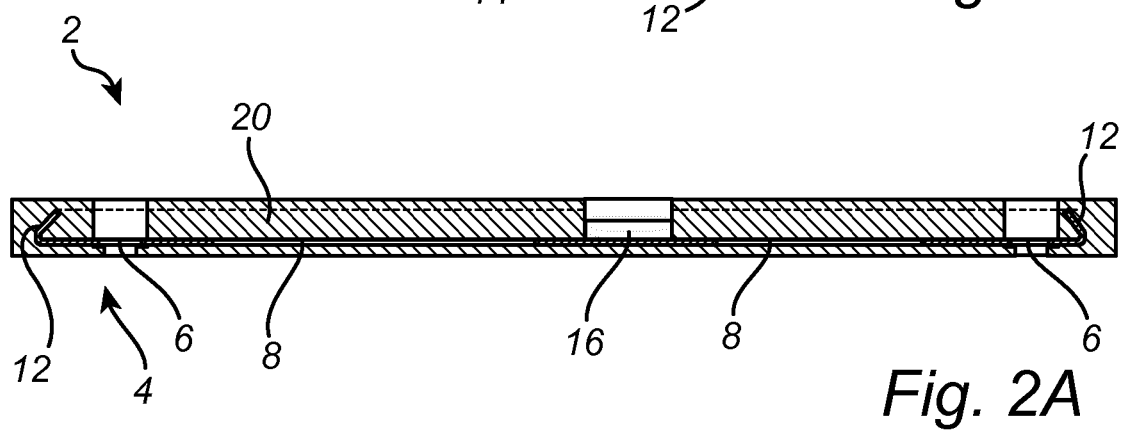
FIG. 2A is a cross-sectional view of the reinforcement plate of FIG. 2 and a rubber coating, forming a haul truck lining element.
Figure 2B:
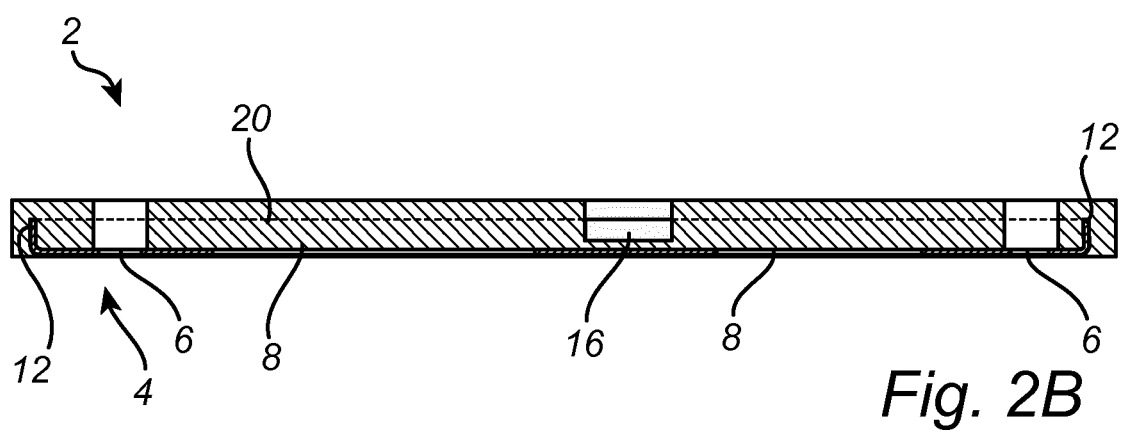
FIG. 2B is a cross-sectional view a reinforcement plate and a rubber coating according to an alternative embodiment.

FIG. 2A shows a cross sectional view of the same reinforcement plate 4 as in FIG. 2, along the cross-section A-A as indicated in FIG. 2, and as well the rubber coating 20. The bent edge 12 of the reinforcement plate 4 grips into the rubber, keeping the rubber in place.

FIG. 2B shows a cross sectional view of an alternative embodiment to the second embodiment of FIGS. 2 and 2A. This embodiment is identical to the second embodiment, with the exception that the edges 12 of the reinforcement plate 4 are bent 90 degrees (also cf. FIG. 5d).

Figure 3:
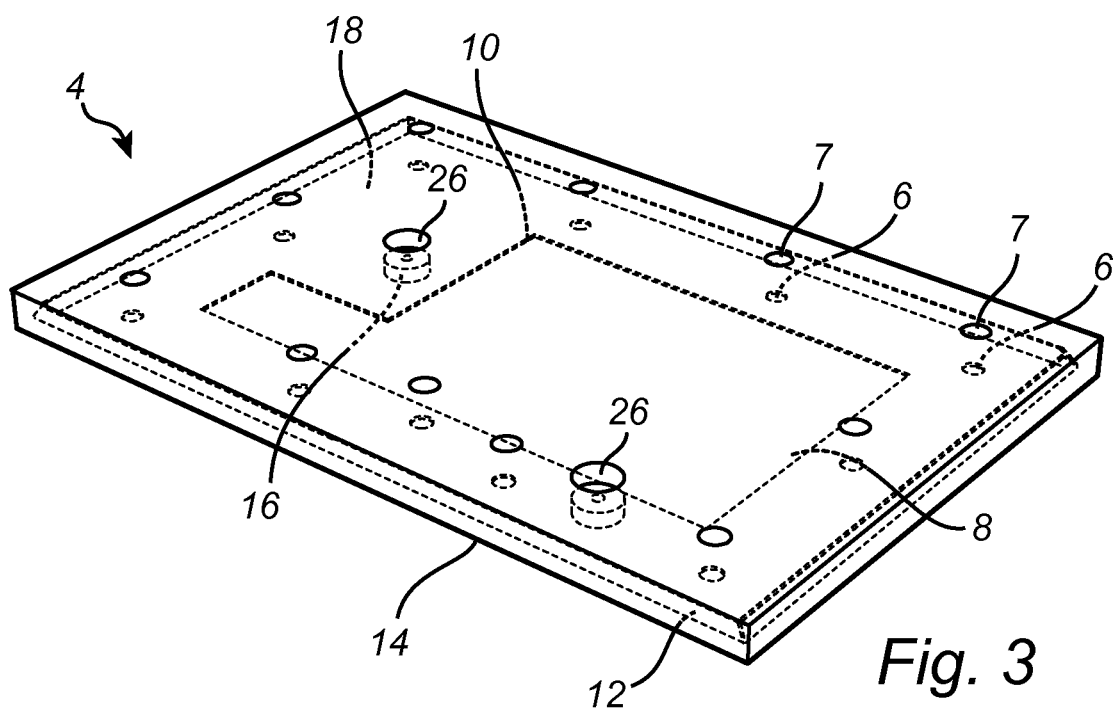
FIG. 3 is a perspective view of a reinforcement plate for a haul truck lining element according to a third embodiment.

FIG. 3 shows a lining element 2 with a reinforcement plate 4 according to a third embodiment. Mounting holes 6 and a bent outer edge 12 are present as for the second embodiment shown in FIG. 2. Contrary to that embodiment, the plate only has one cut-out opening 8, which is shaped as an orthogonal hexagon, which allows for a relatively central placement of a lifting structure 16.

Figure 4:
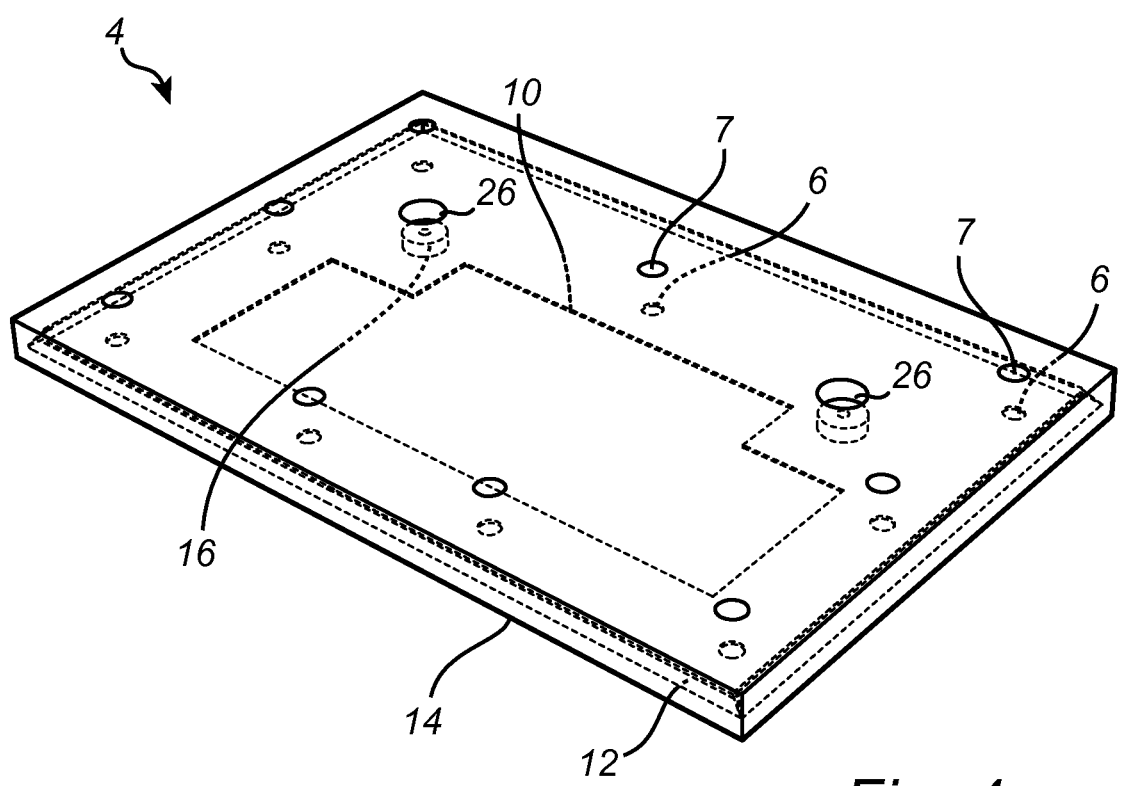
FIG. 4 is a perspective view of a reinforcement plate for a haul truck lining element according to a fourth embodiment.

FIG. 4 shows a reinforcement plate 4 according to a fourth embodiment. Mounting holes 6 and a bent outer edge 12 are present as before. Here, the single cut-out opening 8 has an orthogonal octagon shape allowing for a relatively central placement of two lifting elements 16.

Figure 5A:
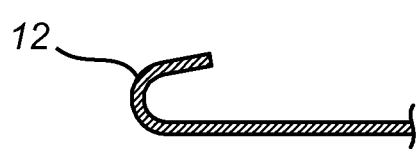
FIGS. 5a, 5b, 5c, and 5d are cross-sectional views of bent edges of reinforcement plates according to different embodiments.
Figure 5C:
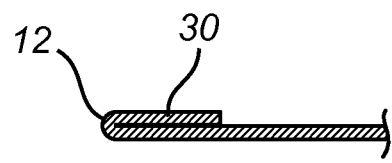
Figure 5B:
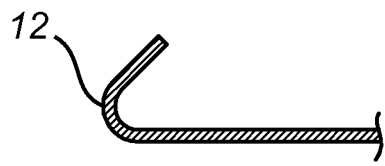

FIGS. 5a and 5b show detailed cross sections of how the edge 12 of the reinforcement plate 4 bends. The bend is preferably more than 90 degrees, and less than 180 degrees, and is thus V-shaped as in FIG. 5b or almost U-shaped as in FIG. 5a, to properly grip the rubber coating. This inward bend prevents the rubber to be cut by the edge upon loading impact.

The bend may also be 180 degrees as shown in FIG. 5c. It may then have an overlapping section 30 with the unbent part of the reinforcement plate.

Figure 5D:

Alternatively, the edge may be bent 90 degrees as shown in FIG. 5d.

Any of the edge configuration of FIGS. 5a-5d may be applied to the first, second, third, or fourth embodiments detailed above.

FIG. 6 shows a haul truck body 100 on which lining elements 2 have been mounted in order to provide a wear-resistant lining 102.

The lining element 2 typically has a length of 300 mm to 2000 mm and a width of 200 mm to 1500 mm. The elastic material 20, e.g., rubber, typically has a total thickness of 30 mm to 150 mm.

Alternatively, the reinforcement plate 4, comprised in a lining element 2, can be seen as being comprised of a plurality of reinforcement strips, each of said reinforcement strips being connected to at least one other reinforcement strip to form the reinforcement plate 4. The reinforcement strips may have mounting holes 6 for mounting on a haul truck body 100 and may be shaped as rectilinear polygons. The reinforcement plate 4 may be made in one piece with cut-out openings 8. Reinforcement strips may form an outer frame 18 of the reinforcement plate 4. The outer frame 18 may be comprised of orthogonal segments. The outer edge 12 of the outer frame 18 may be rectangular. The outer edge 12 the outer frame 18 may be bent.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A substantially flat lining element for a wear-resistant haul truck body lining, said lining element comprising a substantially flat reinforcement plate being at least partly embedded in elastic material, wherein said reinforcement plate comprises a plurality of mounting holes which are arranged for mounting the lining element to a haul truck body and which are not covered by the elastic material, and one or more weight-reducing cut-out openings which are larger than the mounting holes and which are covered by the elastic material, wherein said reinforcement plate comprises one or more bent edges.

2. The lining element according to claim 1, wherein at least one of the bent edges are bent to an angle of between 90 and 180 degrees.

3. The lining element according to claim 1, wherein at least one of said bent edges is folded to abut a main surface of the lining element.

4. The lining element according to claim 1, wherein said lining element comprises an outer peripheral edge and said reinforcement plate presents an outer frame extending along the peripheral edge of the lining element; and wherein said one or more cut-out openings are arranged inside said outer frame.

5. The lining element according to claim 4, wherein at least some of the mounting holes are arranged in the outer frame of the reinforcement plate.

6. The lining element according to claim 4, wherein said reinforcement plate further comprises one or more strip portions extending between side portions of said outer frame for defining said two or more cut-out openings.

7. The lining element according to claim 1, wherein an outer peripheral edge of the lining element defines an outline area of the reinforcement plate, and wherein said one or more cut-out openings together defines a total cut-out area amounting to at least 30% of the outline area of the reinforcement plate.

8. The lining element according to claim 4, wherein said total cut-out area amounts to no more than 40% of the outline area of the reinforcement plate.

9. The lining element according to claim 1, wherein said bent edges are arranged partly at an outer periphery of the reinforcement plate.

10. The lining element according to claim 1, wherein said reinforcement plate is made of steel.

11. The lining element according to claim 1, wherein said lining element further comprises a plurality of holes arranged in said elastic material and aligned with said mounting holes of the reinforcement plate.

12. The lining element according to claim 1, wherein said one or more cut-out openings are shaped as rectilinear polygons.

13. The lining element according to claim 1, wherein said reinforcement plate is completely embedded in said elastic material except for areas at said mounting holes of the reinforcement plate.

14. The lining element according to claim 1, wherein said elastic material comprises rubber.

15. A haul truck body provided with an inner wear-resistant lining formed by a plurality of substantially flat lining elements comprising a substantially flat reinforcement plate being at least partly embedded in elastic material, wherein said reinforcement plate comprises a plurality of mounting holes which are arranged for mounting the lining element to a haul truck body and which are not covered by the elastic material, and one or more weight-reducing cut-out openings which are larger than the mounting holes and which are covered by the elastic material, wherein said reinforcement plate comprises one or more bent edges.

16. The haul truck body according to claim 15 wherein said cut-out openings of said plurality of lining elements are located in areas of said plurality of lining elements where no mounting holes are located for mounting the plurality of lining elements to the haul truck body.

17. A method for manufacturing a substantially flat lining element, comprising:
arranging a substantially flat reinforcement plate in a mold, said reinforcement plate presenting a plurality of mounting holes and one or more weight-reducing cut-out openings which are larger than the mounting holes and one or more bent edges; and
supplying an elastic material to said mold, such that said reinforcement plate is at least partly covered by said elastic material and such that said weight-reducing cut-out openings are covered by said elastic material.

18. The method as claimed in claim 17 wherein said supplying an elastic material comprises covering said one or more bent edges of the reinforcement plate by said elastic material.

19. The method as claimed in claim 17, wherein said reinforcement plate is completely covered by said elastic material excluding areas at said mounting holes.

20. The method as claimed in claimed in claim 17, wherein said method further comprises:
before arranging said reinforcement plate in said mold, providing said reinforcement plate with said plurality of mounting holes; and
before arranging said reinforcement plate in said mold, providing said reinforcement plate with said one or more weight-reducing openings, wherein said one or more weight-reducing openings are located in areas of said reinforcement plate where no mounting holes are located for mounting the lining element to said haul truck body.

\* \* \* \* \*